United States Patent

Burns et al.

[11] Patent Number: 6,041,903
[45] Date of Patent: Mar. 28, 2000

[54] HYDRAULIC COUPLING FOR VEHICULAR POWER TRANSFER SYSTEMS

[75] Inventors: Timothy M. Burns, Jordan; Sankar K. Mohan, Syracuse, both of N.Y.

[73] Assignee: New Venture Gear, Inc., Troy, Mich.

[21] Appl. No.: 09/189,884

[22] Filed: Nov. 11, 1998

Related U.S. Application Data

[60] Provisional application No. 60/069,951, Dec. 17, 1997, and provisional application No. 60/069,811, Dec. 17, 1997.

[51] Int. Cl.[7] .................................................. F16D 25/02
[52] U.S. Cl. ................................ 192/85 AA; 192/103 F; 475/88
[58] Field of Search ........................ 192/35, 54.3, 85 AA, 192/103 F; 475/88

[56] References Cited

U.S. PATENT DOCUMENTS

| | | |
|---|---|---|
| 5,148,900 | 9/1992 | Mohan . |
| 5,310,388 | 5/1994 | Okcuoglu et al. . |
| 5,358,454 | 10/1994 | Bowen et al. . |
| 5,536,215 | 7/1996 | Shaffer et al. . |
| 5,595,214 | 1/1997 | Shaffer et al. . |
| 5,611,746 | 3/1997 | Shaffer . |
| 5,649,459 | 7/1997 | Murakami et al. . |
| 5,702,319 | 12/1997 | Baxter, Jr. .................................. 475/88 |
| 5,704,863 | 1/1998 | Zalewski et al. . |
| 5,749,801 | 5/1998 | Teraoka et al. ........................... 475/88 |
| 5,779,013 | 7/1998 | Bansbach . |
| 5,827,145 | 10/1998 | Okcuoglu . |
| 5,888,163 | 3/1999 | Shaffer et al. ........................... 475/88 |

*Primary Examiner*—Richard M. Lorence
*Attorney, Agent, or Firm*—Harness, Dickey & Pierce, P.L.C.

[57] ABSTRACT

A hydraulic coupling includes a clutch assembly operatively connecting two rotary members and an actuator assembly for actuating the clutch assembly in response to speed differentiation between the two rotary members. The clutch assembly includes a multi-plate clutch pack alternately connected between the two rotary members within a clutch chamber. The actuator assembly includes a hydraulic pump, a piston disposed in a piston chamber, and a fluid distribution system having a first flow path between a supply chamber and the hydraulic pump, a second flow path between the hydraulic pump and the piston chamber, and a third flow path between the hydraulic pump and the clutch chamber. The fluid delivered to the piston chamber controls engagement of the piston with the clutch pack for controlling actuation of the clutch assembly. Additionally, the fluid delivered to the clutch chamber is used to cool and lubricate the clutch pack.

18 Claims, 6 Drawing Sheets

HYDRAULIC COUPLING FOR VEHICULAR POWER TRANSFER SYSTEMS

This Application claims the benefit of U.S. Provisional No's 60/069,951 filed Dec. 17,1997 and 60/069,811 filed Dec. 17, 1997.

BACKGROUND OF THE INVENTION

The present invention relates generally to hydromechanical limited slip couplings of the type used in motor vehicle driveline applications. In particular, the present invention is directed to a hydraulic coupling having a hydraulic pump, a transfer clutch, and a fluid distribution system for distributing fluid from the pump to a first chamber for actuating the transfer clutch and to a second chamber for lubricating and cooling the transfer clutch.

Hydraulic couplings are used in various vehicular drivetrain applications to limit slip and transfer drive torque between a pair of rotary members. In all wheel drive applications, hydraulic couplings are used to automatically control the drive torque transferred from a driven member to a non-driven member in response to speed differentiation therebetween. In limited slip applications, such as in an axle assembly, full-time transfer case or transaxle, hydraulic couplings are used to automatically limit slip and bias the torque distribution between a pair of rotary members. Examples of hydraulic couplings which are adaptable for such driveline applications include viscous couplings, geared traction units, and electronically-controlled friction clutches generally similar to those shown and described in commonly-owned U.S. Pat. Nos. 5,148,900, 5,358,454, 5,649,459, 5,704,863 and 5,779,013.

Hydraulic couplings of the type disclosed in commonly-owned U.S. Pat. No. 5,704,863 include a clutch assembly operatively interconnected between a pair of rotary members, and a hydraulic pump for generating a fluid pumping action in response to relative rotation between the two rotary members that is used to actuate the clutch assembly. The clutch assembly includes a piston which is adapted to exert a clutch engagement force on a clutch pack operatively coupled between the two rotary members. The clutch engagement force is a function of the fluid pressure generated by the hydraulic pump. Additionally, control valving is provided for controlling the torque transfer characteristics of the hydraulic coupling. In particular, the control valving inhibits torque transfer during relatively low speed differentials between the rotary members to accommodate the tight turns required for negotiating curves or parking the motor vehicle. However, when higher speed differentials occur, the pressure generated overcomes the control valving and causes the piston to be applied to the clutch pack. Thus, such hydraulic couplings provide progressive torque transfer characteristics which vary in proportion to the relative differential speeds between the two rotary members.

While known hydraulic couplings, including but not limited to those disclosed or discussed above, have proven to be acceptable for various vehicular driveline applications, such devices are nevertheless susceptible to improvements that may enhance their performance and cost. With this in mind, a need exists to develop improved hydraulic couplings which advance the art.

SUMMARY OF THE INVENTION

Accordingly, it is an object of the present invention to provide a hydraulic coupling for use in motor vehicle driveline applications for limiting slip and transferring torque between a pair of rotary members.

In accordance with this object, the hydraulic coupling of the present invention includes a clutch assembly operatively connecting two rotary members, and an actuator assembly for actuating the clutch assembly in response to and as a function of speed differentiation between the two rotary members. The clutch assembly includes a multi-plate clutch pack alternately connected between the two rotary members within a clutch chamber. The actuator assembly includes a hydraulic pump, a piston disposed in a piston chamber, and a fluid distribution system including a first flow path between a supply chamber and the hydraulic pump, a second flow path between the hydraulic pump and the piston chamber, and a third flow path between the hydraulic pump and the clutch chamber. The fluid delivered to the piston chamber controls engagement of the piston with the clutch pack for controlling actuation of the clutch assembly. Moreover, the fluid delivered to the clutch chamber is used to cool and lubricate the clutch pack.

As an additional feature, the hydraulic coupling is adapted to be installed in a driveline apparatus with its supply chamber in fluid communication with a sump associated with the driveline apparatus.

As an alternative feature, the hydraulic coupling is a sealed unit installed within a driveline apparatus and includes a recirculatory flow path for returning fluid from the piston chamber and the clutch chamber to the supply chamber.

BRIEF DESCRIPTION OF THE DRAWINGS

Further objects, features and advantages of the present invention will become readily apparent from the following detailed specification and the appended claims which, in conjunction with drawings, set forth the best mode now contemplated for carrying out the invention. Referring to the drawings:

DETAILED DESCRIPTION OF THE INVENTION

In general, the present invention is directed to a hydromechanical limited slip and torque transfer apparatus, hereinafter referred to as a hydraulic coupling. Driveline applications contemplated for the hydraulic couplings of the present invention include, but are not limited to, limited slip axle differentials, power take-offs and in-line couplings for use in all-wheel drive vehicles, on-demand couplings and limited slip differentials in use in four-wheel drive transfer cases, limited slip differentials for use in transaxles, and any other type of driveline apparatus requiring drive torque to be transferred between two rotary members. Furthermore, the hydraulic coupling of the present invention find particular application in vehicle driveline apparatuses which are not equipped with secondary lube pumping systems. Accordingly, this invention solves a problem inherent to conventional hydraulic couplings by providing a fluid distribution system and control valving which permit a hydraulic pump to supply fluid from a supply chamber to a piston chamber for actuating a clutch assembly and to a clutch chamber for cooling and lubricating the clutch assembly.

Figure 1:
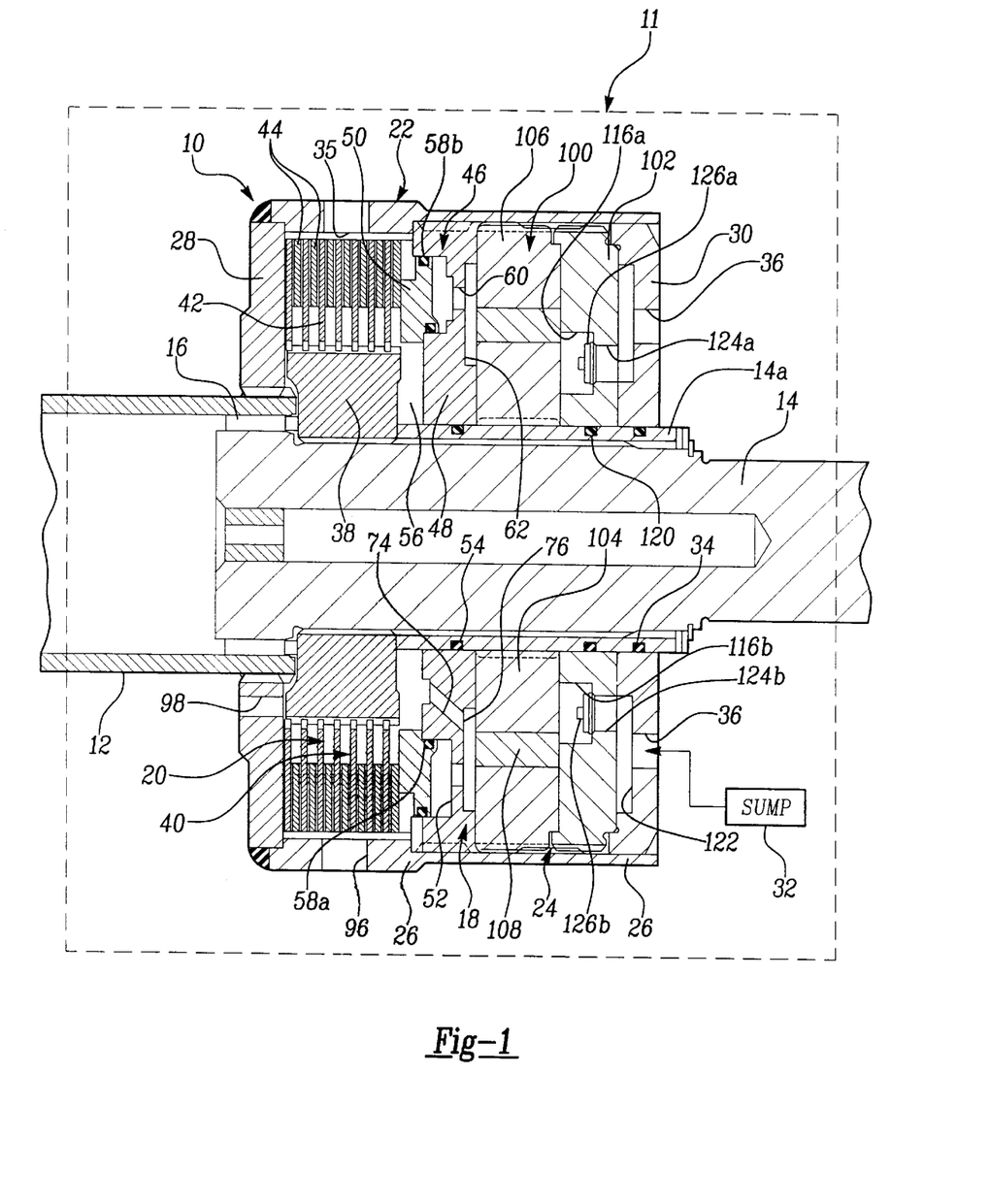
FIG. 1 is a sectional view of a hydraulic coupling operatively interconnected between two rotary members.

Referring initially to FIG. 1, a hydraulic coupling according to the present invention is generally identified with reference numeral 10. Hydraulic coupling 10 is installed within a driveline apparatus 11 and is operatively coupled between a first rotary member and a second rotary member for limiting speed differentiation and/or transferring rotary power (drive torque) therebetween. In the embodiment shown, first rotary member is a primary or driven shaft 14 and second rotary member is a secondary or non-driven shaft 12 which is supported by bearing 16 for rotation relative to driven shaft 14. As will become apparent below, hydraulic coupling 10 is adapted to automatically and progressively couple shafts 12 and 14 in response to excessive rotational speed differences therebetween. While the following disclosure is directed to transfer of torque from shaft 14 to shaft 12 it is understood that, in other applications, shaft 12 could be the driven rotary member.

In general, hydraulic coupling 10 includes a pump assembly 18 and a transfer clutch 20 that are operably arranged within a cover assembly 22. According to the embodiment shown, pump assembly 18 includes a bidirectional hydraulic pump 24 and a piston assembly 46 while transfer clutch 20 is a hydraulically-actuated multi-plate clutch assembly. Cover assembly 22 includes a cylindrical outer drum 26 and a pair of cover plates 28 and 30 secured (i.e., welded) thereto. Cover plate 28 is shown fixed (i.e., splined) to shaft 12 such that cover assembly 22 drives or is driven by shaft 12. Likewise, a tubular pump shaft 14a is splined to shaft 14 and is shown to support an O-ring seal 34 for permitting cover plate 30 of cover assembly 22 to rotate relative to pump shaft 14a while providing a fluid-tight seal therebetween. As such, cover assembly 22 surrounds second shaft 14 and defines an annular drum chamber 35 therewith. A pair of inlets 36 are formed through cover plate 30 for permitting hydraulic fluid to be drawn into hydraulic coupling 10 from a sump, schematically identified by block 32, located within drivetrain apparatus 11.

With continued reference to FIG. 1, transfer clutch 20 is shown located within drum chamber 35 and includes a clutch hub 38 fixed (i.e., splined) to shaft 14 (or pump shaft 14a), and a multi-plate clutch pack 40. Clutch pack 40 includes a plurality of inner clutch plates 42 fixed (i.e., splined) to clutch hub 38 and which are alternately interleaved with a plurality of outer clutch plates 44 fixed (i.e., splined) to outer drum 26. Alternatively, clutch hub 38 may be eliminated with inner clutch plates 42 splined directly to one of shafts 14 and 14a. Piston assembly 46 includes a piston housing 48 that is fixed (i.e., splined) at its outer periphery to outer drum 26, and a piston 50 that is retained for sliding movement in an annular piston chamber 52 formed in piston housing 48. As shown, an O-ring seal 54 is retained in a groove formed in pump shaft 14a for permitting piston housing 48 to rotate relative to pump shaft 14a while providing a fluid-tight seal therebetween. As such, piston assembly 46 cooperates with cover assembly 22 to define a clutch chamber 56. In addition, O-ring seals 58a and 58b are disposed between the mating edge surfaces of piston chamber 52 and piston 50. Thus, piston 50 is supported for axial sliding movement within piston chamber 52 relative to interleaved multi-plate clutch pack 40 for applying a compressive clutch engagement force thereon, thereby transferring drive torque from driven shaft 14 to non-driven shaft 12. Alternatively, piston 50 may have a cover material bonded thereto, such as rubber, to provide a sealed sliding engagement with the inner and outer edge surfaces of piston chamber 52. The amount of torque transfer between shafts 14 and 12 is progressive in that it is proportional to the magnitude of the clutch engagement force exerted by piston 50 on clutch pack 40 which, in turn, is a function of the fluid pressure within piston chamber 52. Moreover, the magnitude of the fluid pressure within piston chamber 52 is controlled as a function of the speed differential ($\Delta$RPM) between shafts 12 and 14.

Figure 2:
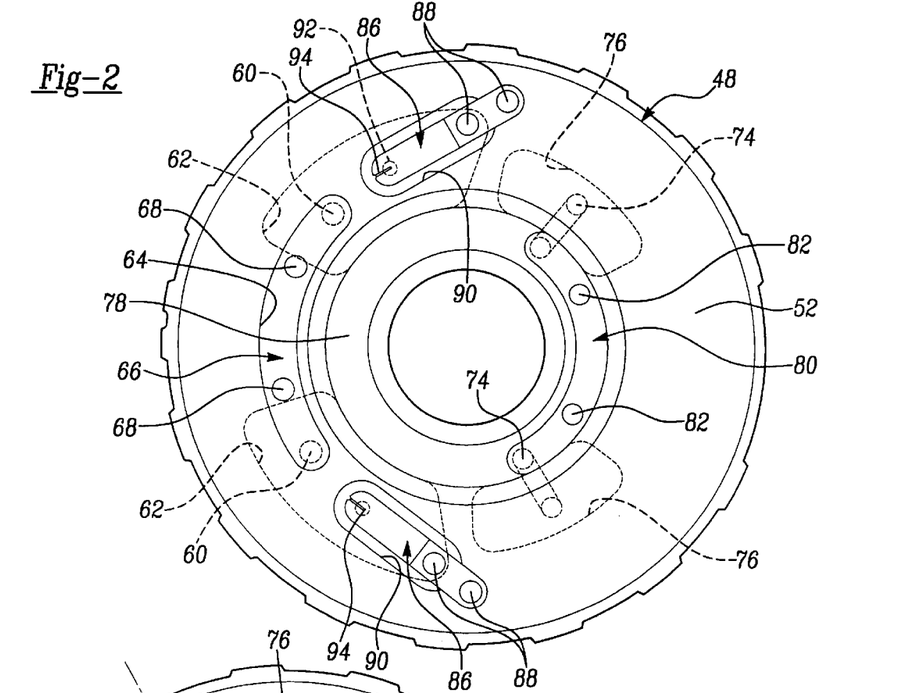
FIG. 2 is a side view of the piston housing associated with the hydraulic coupling shown in FIG. 1.
Figure 3:
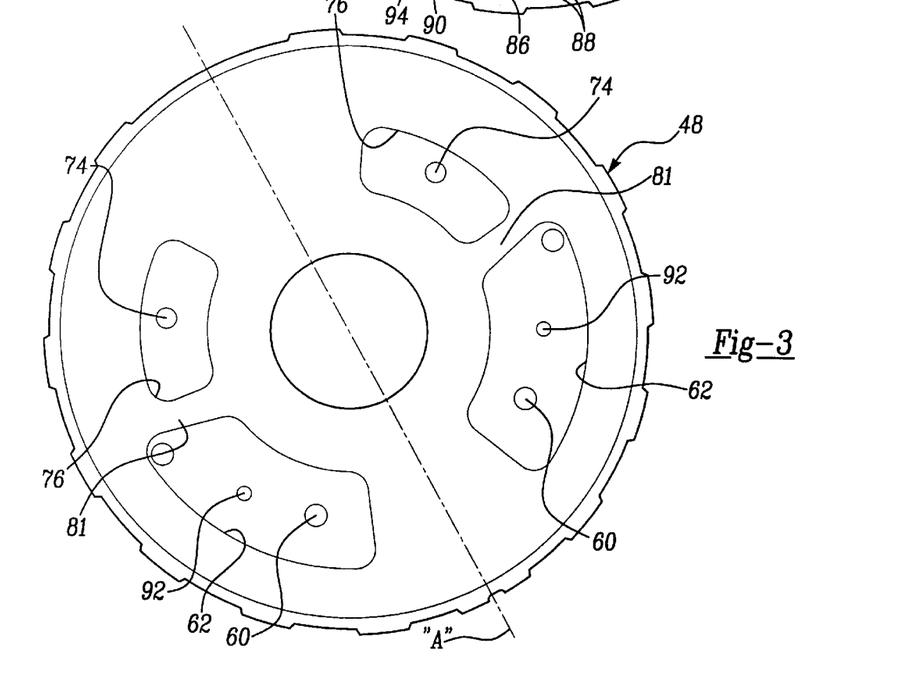
FIG. 3 is an opposite side view of the piston housing shown in FIG. 2.

With particular reference now to FIGS. 1 through 3, piston housing 48 is shown to have a fluid distribution and valving arrangement that is operable for selectively controlling the delivery of fluid to piston chamber 52 and clutch chamber 56 from hydraulic pump 24. In particular, piston housing 48 includes a pair of first transfer ports 60 each extending between and communicating with one of a pair of first shadow slots 62 and an arcuate piston inlet slot 64 formed in piston chamber 52.

A check valve 66 is mounted by rivets 68 in piston inlet slot 64 and its opposite terminal ends overlie first transfer ports 60. Preferably, check valve 66 is an elongated metallic reed valve element. Based on the direction of relative rotation between shafts 12 and 14 (which results in a corresponding directional rotation of hydraulic pump 24), the hydraulic pressure in one of first shadow slots 62 generated by the pumping action of hydraulic pump 24 causes the corresponding terminal end of check valve 66 to resiliently deflect to an "open" position away from piston inlet slot 64 in piston housing 48, thereby opening its corresponding first transfer port 60 to permit fluid to flow from that particular first shadow slot 62 into piston chamber 52.

Concurrently, the lower fluid pressure in the other of first shadow slots 62 is unable to move the other terminal end of check valve 66 which is maintained in a "closed" position within piston inlet slot 64 for inhibiting the discharge of hydraulic fluid from piston chamber 52 through the other of first transfer ports 60. As such, the hydraulic fluid in piston chamber 52, if it exceeds a predetermined minimum pressure, will actuate transfer clutch 20 by moving piston 50 toward the clutch pack for applying the resultant clutch engagement force thereon. During the opposite direction of relative rotation between shafts 12 and 14, the open and closed positions mentioned above for the terminal ends of check valve 66 are reversed for each first transfer port 60. Upon cessation of the pumping action, each terminal end of check valve 66 is biased to return to its respective closed position for maintaining a supply of fluid in piston chamber 52. Thus, check valve 66 functions as a normally-closed valve. As will be appreciated, a separate reed-type check valve could be used with each first transfer port 60 and/or any other suitable type of check valve could be used to control flow into piston chamber 52 from hydraulic pump 24.

As seen from FIGS. 2 and 3, piston housing 48 also includes a pair of second transfer ports 74 each of which communicate with one of a pair of second shadow slots 76 and an annular discharge cavity 78 which communicates with clutch chamber 56. The valving arrangement associated with piston housing 48 further includes a check valve 80 mounted by rivets 82 in discharge cavity 78. As is similar to check valve 66, check valve 80 is preferably an elongated metallic reed valve element. Based on the direction of relative rotation between shafts 12 and 14, hydraulic pressure in one of second shadow slots 76 generated by the pumping action of hydraulic pump 24 will cause the corresponding terminal end of check valve 80 to resiliently deflect to an "open" position away from piston housing 48, thereby opening its corresponding second transfer port 74 to permit the flow of pumped hydraulic fluid into discharge cavity 78 and clutch chamber 56. Concurrently, the other terminal end of check valve 80 is maintained in a "closed" position relative to piston housing 48 for inhibiting the flow of hydraulic fluid from clutch chamber 56 through the other second transfer port 74. Upon cessation of the pumping action, each terminal end of check valve 80 is biased to return to its respective closed position. As before, a separate reed-type check valve can be used with each second transfer port 74 and any other type of suitable check valve can be used.

As best seen from FIG. 3, first shadow slots 62 and second shadow slots 76 are symmetrical about line "A". In addition, a web portion 81 separates each first shadow slot 62 from a corresponding second shadow slot 76. As such, fluid can be delivered from second shadow slots 76 through second transfer ports 74 to discharge cavity 78 without affecting the fluid pressure delivered through first transfer ports 60 to piston chamber 52. Thus, the pressurization characteristics for piston chamber 52 can be tuned for controlling movement of piston 50 and actuation of transfer clutch 20 in a manner which is independent of the pumped fluid used to lubricate and cool clutch pack 40 in clutch chamber 56. In this manner, the fluid pressure delivered to piston chamber 52 is higher than the fluid pressure delivered to clutch chamber 56 since the fluid in clutch chamber 56 is not intended to actuate transfer clutch 20. Optionally, second shadow slot 76 could be used for delivery of high pressure fluid to piston chamber and first shadow slot 62 could be used for delivery of low pressure fluid to clutch chamber 56. Moreover, the relative size of transfer ports 60 and 74 are selected to provide the flow rate needed at the two pressures.

Hydraulic coupling 10 includes a control valve arrangement which is operable for setting the predetermined minimum pressure level within piston chamber 52 at which transfer clutch 20 is initially actuated to transfer drive torque and which is further operable to compensate for viscosity changes in the hydraulic fluid. As shown in FIG. 2, a pair of control valves 86 are secured by rivets 88 in chamfered bleed slots 90 formed in piston chamber 52 such that the terminal end of each control valve 86 is normally maintained in an "open" position displaced from a bleed port 92. Bleed ports 92 extend through piston housing 48 and provide fluid communication between first transfer ports 60 and bleed slots 90. During initial relative rotation, the pumping action of hydraulic pump 24 causes fluid to be supplied to piston chamber 52 through one of bleed ports 92 from its corresponding first shadow slot 62 on the discharge side of hydraulic pump 24. Concurrently, fluid is discharged from piston chamber 52 through the other bleed port 92 to its corresponding first shadow slot 62 on the suction side of hydraulic pump 24. As an alternative arrangement, a bleed port can be formed through piston 50 with a control valve 86 arranged for controlling flow from piston chamber 52 into clutch chamber 56.

Control valves 86 are preferably bimetallic valve elements made of a laminated pair of dissimilar metallic strips having different coefficients of thermal expansion. As such, the terminal end of each control valve 86 moves relative to its corresponding bleed port 92 as the fluid temperature varies for controlling fluid flow through bleed ports 92 regardless of changes in the viscosity of hydraulic fluid caused by temperature changes. However, when the ΔRPM exceeds a predetermined actuation value, the fluid in piston chamber 52 reaches its predetermined pressure level and causes the terminal end of control valve 86 on the suction side of pump 24 to move to its "closed" position for inhibiting fluid flow through its corresponding bleed port 92. This flow restriction causes an increase in fluid pressure within piston chamber 52 which, in turn, causes piston 50 to exert a large clutch engagement force on clutch pack 40 for actuating transfer clutch 20. A by-pass groove 94 is shown formed in the terminal end of each control valve 86 to permit a small amount of bleed flow out of piston chamber 52 even when control valve 86 is in its closed position to gradually depressurize piston chamber 52 and disengage transfer clutch 20 when pump 24 is inactive. As an alternative, the bleed groove can be formed in bleed slot 90 and communicate with bleed port 92.

Figure 4:
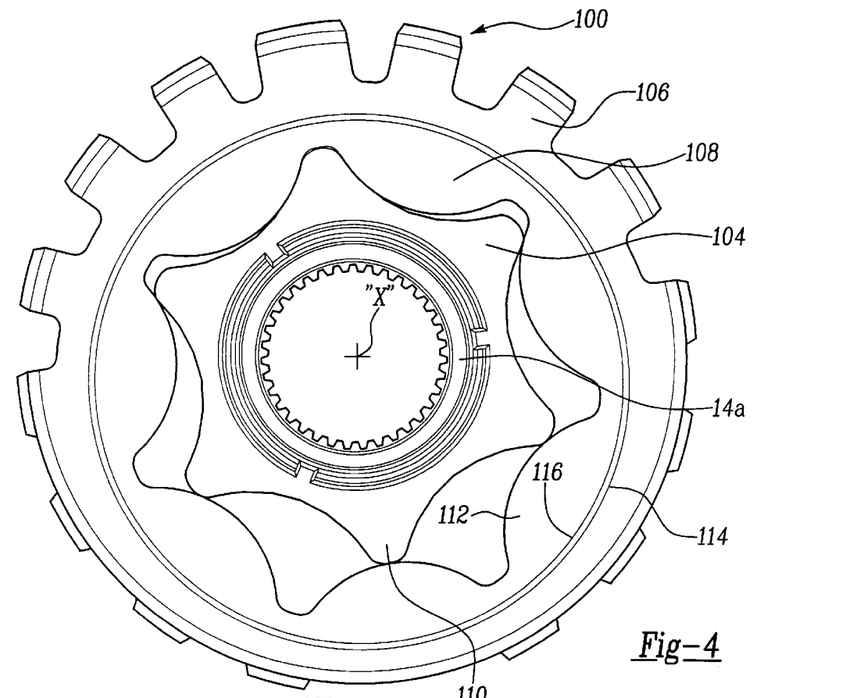
FIG. 4 is a side view showing the components of the hydraulic pump associated with the hydraulic coupling shown in FIG. 1.

As noted, hydraulic pump 24 is operable for pumping hydraulic fluid through first transfer ports 60 into piston chamber 52 to actuate transfer clutch 20 and for pumping hydraulic fluid through second transfer ports 74 into clutch chamber 56 for cooling and lubricating clutch pack 40. Preferably, hydraulic pump 24 is a bi-directional rotary pump capable of pumping fluid at a rate proportional to the speed differential between shafts 14 and 12. According to a preferred construction, hydraulic pump 24 includes a gerotor pump assembly 100 and a pump housing 102 which are both located within drum chamber 35. Referring to FIGS. 1 and 4, gerotor pump assembly 100 is shown as a three component arrangement including a pump ring 104 that is fixed (i.e., keyed or splined) to pump shaft 14*a*, an eccentric ring 106 that is fixed (i.e., splined) to outer drum 26, and a stator ring 108 that is operably disposed therebetween. Pump ring 104 has a plurality of external teeth 110 that rotate concentrically relative to pump shaft 14*a* about a common rotational axis, as noted by axis line "X". Stator ring 108 includes a plurality of internal lobes 112 and has an outer circumferential edge surface 114 that is journally rotatably supported within a circular internal bore 116 formed in eccentric ring 106. Internal bore 116 is offset from the rotational axis "X" such that, due to meshing of internal lobes 112 of stator ring 108 with external teeth 110 of pump ring 104, relative rotation between pump ring 104 and eccentric ring 106 causes eccentric rotation of stator ring 108.

This eccentric arrangement results in pumping action of fluid under pressure from pump inlet slots 116 formed in pump housing 102 on the inlet side of hydraulic pump 24 to corresponding first and second shadow slots 62 and 76 formed in piston housing 48 adjacent the discharge side of pump 24. Preferably, stator ring 108 has a number of lobes 112 that is one more than the number of teeth 110 provided on pump ring 104. As an alternative, hydraulic pump 24 can be a gear pump or any other fluid pump operable for generating hydraulic pressure in response to relative rotation between two pump components.

Gerotor pump assembly 100 is shown operably installed within drum chamber 35 between piston housing 48 and pump housing 102. Pump housing 102 is shown to have its outer peripheral surface fixed (i.e., splined) for rotation with outer drum 26 while its inner peripheral surface is journally supported for relative rotation with respect to pump shaft 14a and is sealed relative thereto by an O-ring seal 120.

Figure 5:
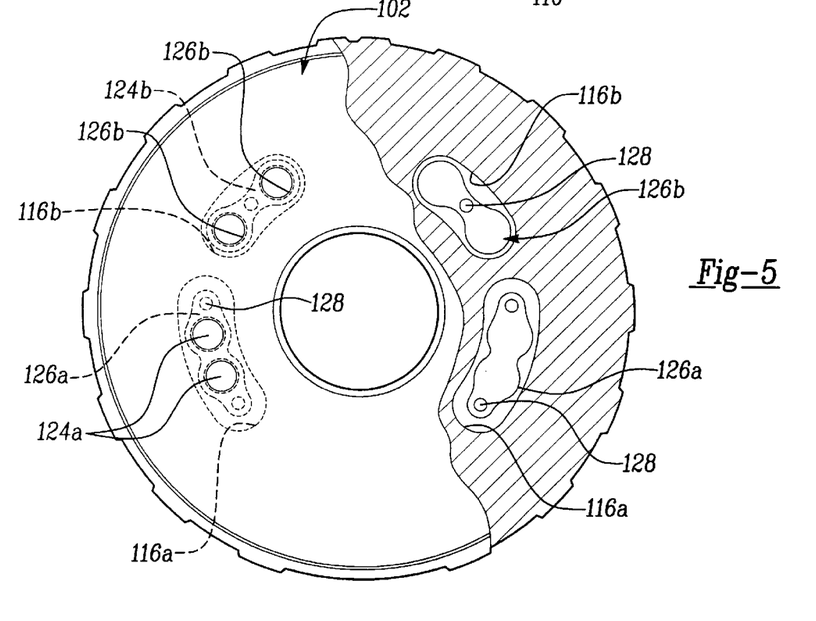
FIG. 5 is a side view, partially broken away, of the pump housing associated with the hydraulic coupling shown in FIG. 1.

Cover plate 30 is formed to include an annular supply chamber 122 which communicates with inlets 36. Pump housing 102 includes a series of first inlet ports 124a extending between first inlet slots 116a and supply chamber 122. Pump housing 102 also includes a series of second inlet ports 124b extending between second inlet slots 116b and supply chamber 122. When hydraulic pump 24 is assembled, first inlet slots 116a are aligned with first shadow slots 62 and second inlet slots 116b are aligned with second shadow slots 76. A valving arrangement controls the delivery of fluid from supply chamber 122 into first and second inlet slots 116a and 116b. In particular, FIG. 5 shows first and second check valves 126a and 126b respectively mounted by rivets 128 within first and second inlet slots 116a and 116b and which have bulbous valve segments that overlie inlet ports 124a and 124b for controlling flow therethrough. Check valves 126a and 126b are elongated metallic valve elements that are adapted to slide on rivets 128 from a "closed" position to an "open" position in response to the directional pumping action of hydraulic pump 24 such that hydraulic fluid within supply chamber 122 is drawn into a corresponding set of inlet ports 124a and 124b. Upon cessation of the pumping action, check valve 126a and 126b are adapted to return to their respective closed positions for maintaining a supply of fluid within inlet slots 116a and 116b. As an option, cover plate 30 can be eliminated with pump housing 102 welded to outer drum 26 such that inlet ports 124a and 124b communicate with sump 32. Hydraulic coupling 10 further includes a fluid flow path for returning fluid from clutch chamber 56 to sump 32. This fluid flow path is defined in part by lubrication ports 96 and 98 formed respectively in outer drum 26 and cover plate 28.

Figure 6:
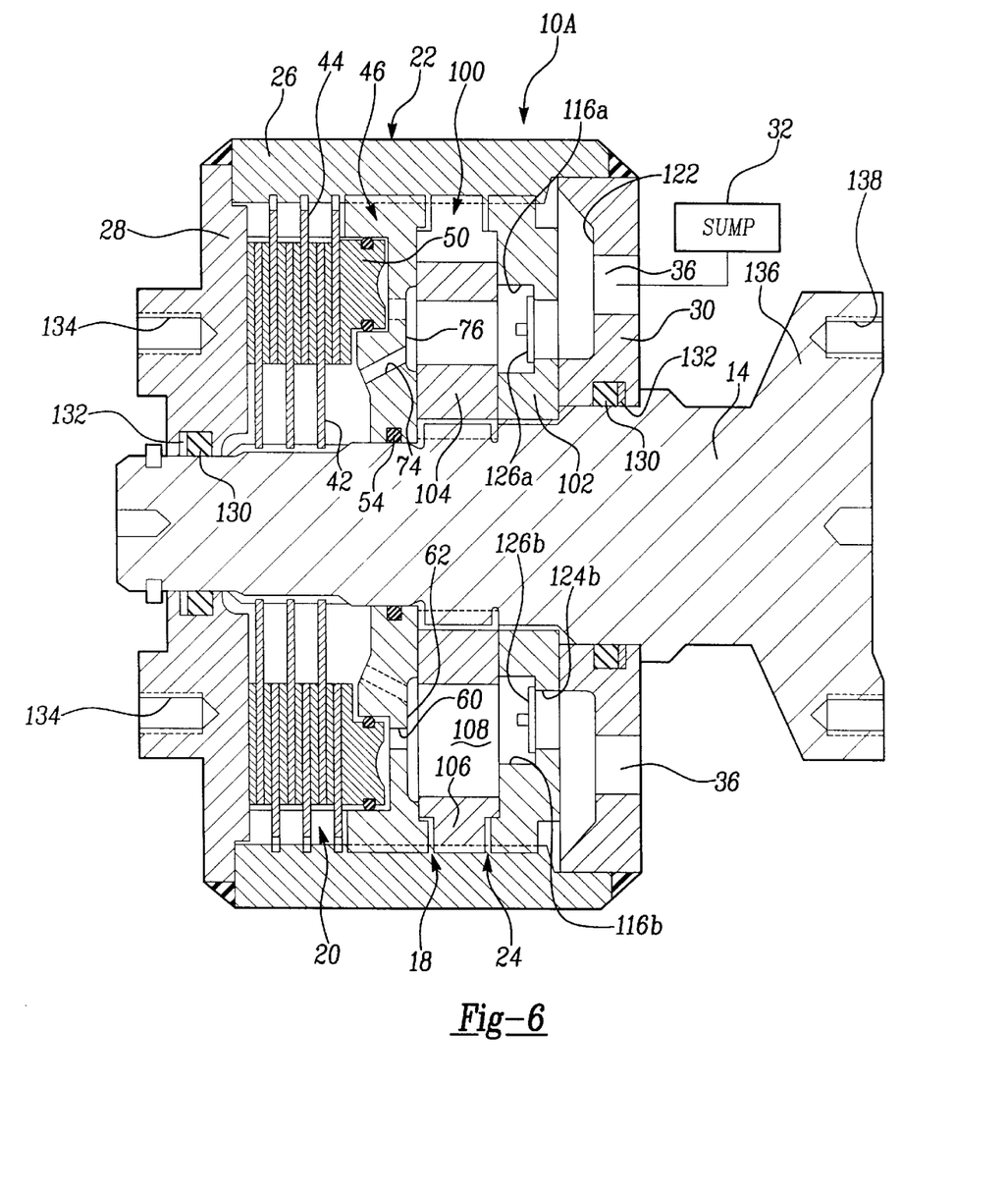
FIGS. 6 and 6A illustrates alternative construction for the hydraulic coupling of the present invention.
Figure 6A:
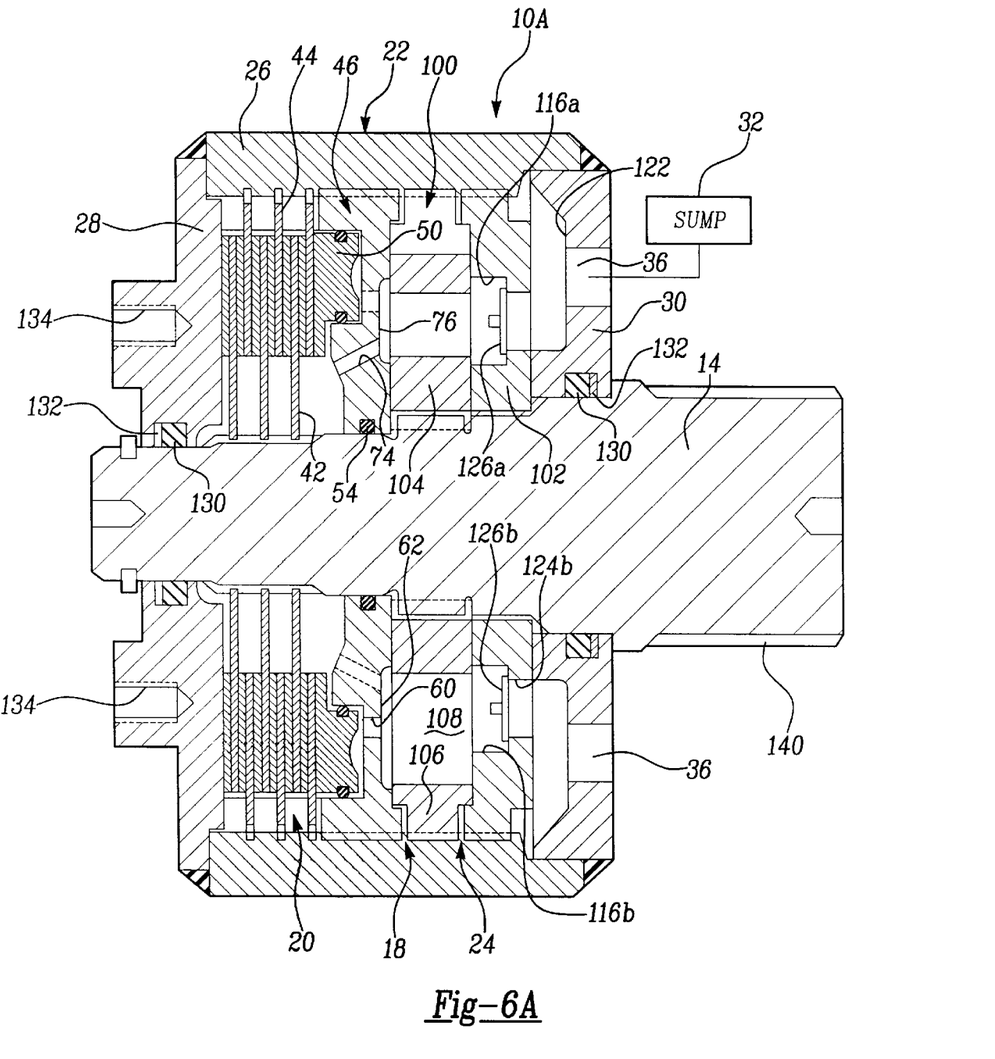

Referring now to FIG. 6, an alternative embodiment of hydraulic coupling 10 is shown and identified by reference numeral 10A. Common reference numerals are used to identify similar elements with the following description limited primarily to the differences between hydraulic couplings 10 and 10A. In particular, hydraulic coupling 10A is shown with pump shaft 14a eliminated such that cover plates 28 and 30 of cover assembly 22 are rotatably supported on shaft 14 by bearings 130 and sealed relative thereto by suitable seals 132. Cover plate 28 includes threaded bores 134 that are adapted to accept threaded fasteners for fixing a rotary component (i.e., a yoke, a sprocket, a ring gear, etc.) to cover assembly 22. Transfer clutch 20 is also shown with clutch hub 38 eliminated such that inner plates 42 are splined directly to shaft 14. Furthermore, FIG. 6 shows shaft 14 to include a yoke 136 with threaded apertures 138 for receipt of threaded fasteners to secure shaft 14 to another shaft or other types of rotary members and/or joints. A slightly modified version of hydraulic coupling 10A is shown in FIG. 6A wherein shaft 14 includes external splines 140 for connection to internal splines of another driveline component.

Figure 7:
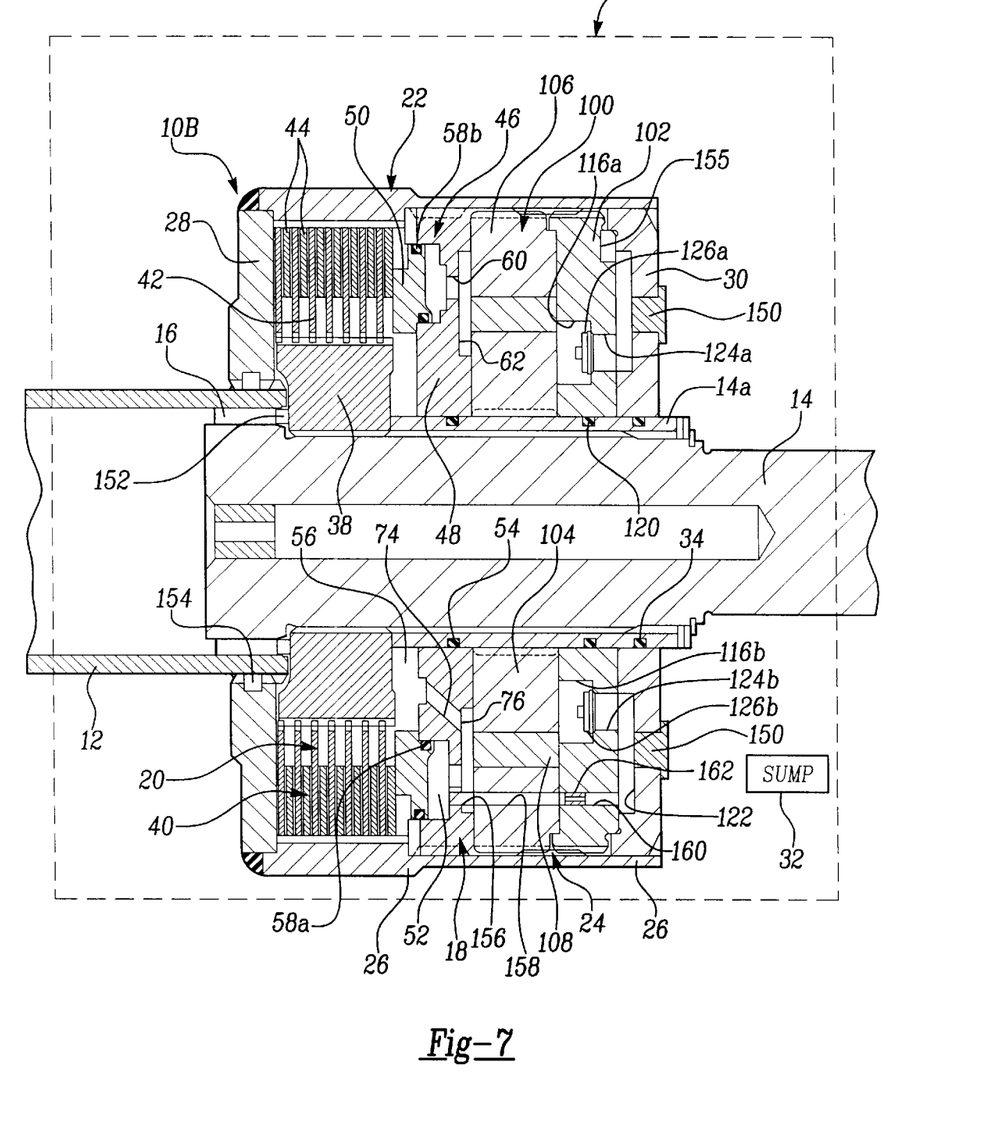
FIG. 7 is a sectional view of a sealed version of the hydraulic coupling shown in FIG. 1 constructed according to another embodiment of the present invention.

Referring now to FIG. 7, a self-contained or "sealed" hydraulic coupling 10B is shown. Since hydraulic coupling 10B is sealed relative to driveline apparatus 11, it does not require fluid to be drawn from sump 32 and, as such, includes an internal recirculatory flow path for returning fluid in piston chamber 52 and clutch chamber 56 to supply chamber 122. In most aspects, the construction of hydraulic coupling 10B is similar to that of hydraulic coupling 10 of FIG. 1 with the exceptions that lubrication ports 96 and 98 in cover assembly 22 have been eliminated to seal clutch chamber 56 relative to sump 32, a plug 150 has been mounted in inlet 36 to seal supply chamber 122 relative to sump 32, and seals 152 and 154 have been added to assist in preventing the fluid within hydraulic coupling 10B from leaking into sump 32 of driveline apparatus 11. Due to the sealed arrangement, the type of fluid used within hydraulic coupling 10B can be different from that used within driveline apparatus 11.

To provide means for returning fluid in hydraulic coupling 10B from clutch chamber 56 to supply chamber 122, a return flow path is provided by eliminating one or more of the longitudinal internal spline teeth on outer drum 26. As such, fluid within clutch chamber 56 travels along the channel(s) formed by the missing spline teeth past the outer periphery of piston housing 48, eccentric ring 106, and pump housing 102. One or more recessed notches 155 are formed in pump housing 102 to permit fluid in the channel(s) to flow into supply chamber 122. Likewise, to provide means for returning fluid in hydraulic coupling 10B from piston chamber 50 to supply chamber 122, a bleed flow path is provided by a series of aligned throughbores 156, 158 and 160 formed respectively in pump housing 48, eccentric ring 106, and pump housing 102. A flow control valve 162 is mounted in one of throughbores 156, 158 and 160 to create the desired flow characteristics through the flow path.

Thus, the present invention is directed to providing both sealed and unsealed construction for a hydraulic coupling equipped with a clutch assembly, a hydraulic pump and a fluid distribution system for delivering fluid from the hydraulic pump to a first flow path for actuating the clutch assembly and to a second flow path for cooling the clutch assembly. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic coupling for use in a motor vehicle driveline apparatus to rotatively couple first and second rotary members, the hydraulic coupling comprising:

a cover assembly fixed for rotation with the first rotary member and surrounding the second rotary member to define a drum chamber;

a transfer clutch located in said drum chamber and including a clutch pack having a first clutch plate fixed for rotation with said cover assembly and a second clutch plate fixed for rotation with the second rotary member;

a piston housing located in said drum chamber and defining a piston chamber, a first transfer port in fluid communication with said piston chamber, and a second transfer port in fluid communication with said clutch pack;

a piston disposed in said piston chamber for movement relative to said clutch pack for exerting a clutch engagement force thereon the magnitude of which is a function of the fluid pressure in said piston chamber; and a hydraulic pump located in said drum chamber and operative for delivering fluid to said first and second transfer ports in response to a speed differential between the first and second rotary members.

2. The hydraulic coupling of claim 1 wherein said piston housing is positioned between said clutch pack and said hydraulic pump and includes a first slot communicating with said first transfer port and a second slot communicating with said second transfer port, said hydraulic pump operable to deliver fluid to said first and second slots in response to speed differentiation between the first and second rotary members.

3. The hydraulic coupling of claim 2 further comprising:
a first check valve movable between an open position and a closed position relative to said first transfer port for permitting fluid to flow from said first slot into said piston chamber while preventing fluid flow from said piston chamber into said first slot; and
a second check valve movable between an open position and a closed position relative to said second transfer port for permitting fluid to flow from said second slot into said clutch chamber while preventing fluid flow from said clutch chamber into said second slot.

4. The hydraulic coupling of claim 3 wherein said first and second check valves are mounted to said piston housing for movement relative thereto.

5. The hydraulic coupling of claim 1 wherein said clutch pack is retained in a clutch chamber formed within said cover assembly, and wherein said piston housing is disposed in said cover assembly between said hydraulic pump and said clutch chamber.

6. The hydraulic coupling of claim 5 wherein said clutch chamber is sealed relative to said cover assembly such that fluid in said clutch chamber is transferred through a flow passage to a supply chamber at an inlet to said hydraulic pump.

7. A hydraulic coupling for rotatively coupling a first shaft and a second shaft, comprising:
a cover assembly coupled for rotation with the first shaft;
a piston housing located between said cover assembly and the second shaft, said piston housing defining a piston chamber, a first transfer port in fluid communication with said piston chamber, a clutch chamber, and a second transfer port in fluid communication with said clutch chamber;
a transfer clutch disposed in said clutch chamber and operatively connected between said cover assembly and the second shaft;
a piston disposed in said piston chamber for movement relative to said transfer clutch for exerting a clutch engagement force thereon the magnitude of which is a function of the fluid pressure in said piston chamber; and
a hydraulic pump including a first pump component coupled for rotation with said cover assembly and a second pump component coupled for rotation with the second shaft, said hydraulic pump operative for pumping fluid into said first and second transfer ports in response to speed differentiation between said first and second pump components.

8. The hydraulic coupling of claim 7 wherein said piston housing is positioned between said transfer clutch and said hydraulic pump and further includes a first slot communicating with said first transfer port and a second slot communicating with said second transfer port, and said hydraulic pump is operable for delivering fluid to said first and second slots.

9. The hydraulic coupling of claim 1 further comprising:
a first check valve movable between an open position and a closed position relative to said first transfer port for permitting fluid to flow from said first slot into said piston chamber while preventing fluid flow from said piston chamber into said first slot; and
a second check valve movable between an open position and a closed position relative to said second transfer port for permitting fluid to flow from said second slot into said clutch chamber while preventing fluid flow from said clutch chamber into said second slot.

10. The hydraulic coupling of claim 9 wherein said first and second check valves are mounted to said piston housing for movement relative thereto.

11. The hydraulic coupling of claim 8 wherein said clutch chamber is sealed relative to said cover assembly such that fluid in said clutch chamber is transferred through a flow passage to a supply chamber provided at an inlet to said hydraulic pump.

12. The hydraulic coupling of claim 7 wherein said cover assembly includes an outer drum, a first cover plate secured to said outer drum and fixed to the first shaft, and a second cover plate fixed to said outer drum and sealed relative to the second shaft, said hydraulic coupling further including a check valve for permitting fluid to flow from a sump into a supply chamber through a port in said second cover plate while preventing flow from said supply chamber into said sump.

13. A hydraulic coupling for use in a driveline apparatus having a casing containing hydraulic fluid to rotatively couple first and second rotary member, the hydraulic coupling comprising:
a transfer clutch disposed in a clutch chamber and operatively connected between the first and second rotary members;
a piston housing defining a piston chamber;
a piston disposed in said piston chamber and actuatable to engage said transfer clutch and rotatively couple the first and second rotary members;
a hydraulic pump for providing a pumping action in response to relative rotation between the first and second rotary members;
a first flow path for supplying hydraulic fluid from a sump in the casing to said hydraulic pump;
a second flow path for supplying hydraulic fluid from said hydraulic pump to said piston chamber; and
a third flow path for supplying hydraulic fluid from said hydraulic pump to said clutch chamber.

14. The hydraulic coupling of claim 13 wherein said second flow path includes a first transfer port formed through said piston housing and said third flow path includes a second transfer port formed through said piston housing.

15. The hydraulic coupling of claim 14 wherein said piston housing is positioned between said transfer clutch and said hydraulic pump, and said second flow path further includes a first slot formed in said piston housing which communicates with said first transfer port, and said third flow path further includes a second slot formed in said piston housing which communicates with said second transfer port, and wherein said hydraulic pump is operable for supplying hydraulic fluid to said first and second slots.

16. The hydraulic coupling of claim 15 further comprising:
a first check valve movable between an open position and a closed position relative to said first transfer port; and
a second check valve movable between an open position and a closed position relative to said second transfer port.

17. The hydraulic coupling of claim 16 wherein said first and second check valves are mounted to said piston housing for movement relative thereto.

18. The hydraulic coupling of claim 13 wherein said clutch chamber is sealed such that fluid in said clutch chamber is transferred through a flow passage to a supply chamber at an inlet to said hydraulic pump.

* * * * *